March 15, 1966 PALLE-FINN BEER 3,240,500

ARRANGEMENT IN SOUND-RECORDING APPARATUS

Filed March 1, 1962

INVENTOR
PALLE-FINN BEER

United States Patent Office 3,240,500
Patented Mar. 15, 1966

3,240,500
ARRANGEMENT IN SOUND-RECORDING APPARATUS

Palle-Finn Beer, Lidingo, Sweden, assignor to Svenska Aktiebolaget Gasaccumulator, Lidingo, Sweden, a corporation of Sweden Filed Mar. 1, 1962, Ser. No. 176,670
Claims priority, application Sweden, Mar. 8, 1961, 2,456/61
7 Claims. (Cl. 274—12)

In recording apparatus having a rotatable disc serving as a record carrier, the disc is usually supported by a carriage, which is reciprocable with regard to a radius of the disc, whereby during the rotation of the disc simultaneously with the displacement thereof a stationary recording head can trace out during the recording a spiral-shaped record track on the disc and cooperate with the same track during the reproduction. The carriage supporting the disc may have a U-shaped rectangular cross-section and be supported with the aid of balls by a rectangular case.

In apparatus of this type it is essential that the carriage be easily displaceable relative to the supporting case at the same time as the carriage must be supported with absolutely no play, if there is to be no wow or other distortion created in the apparatus.

The present invention relates to an arrangement for supporting a carriage of this type and which meets the most stringent requirements in this regard, being at the same time inexpensive and simple in manufacture. According to the invention, the balls are arranged between the carriage and the case in contact with the interior corners of the carriage and running on ball races provided on the case by removal, folding or the like of corresponding portions of the corners thereof, whereby the balls rest on the lateral walls of the case and are guided laterally by the lid of the case. To suppress completely any possibility of play, the carriage may be forced over the balls running on the ball races with the material of the carriage being subjected to a resilient deformation.

Figure 1:
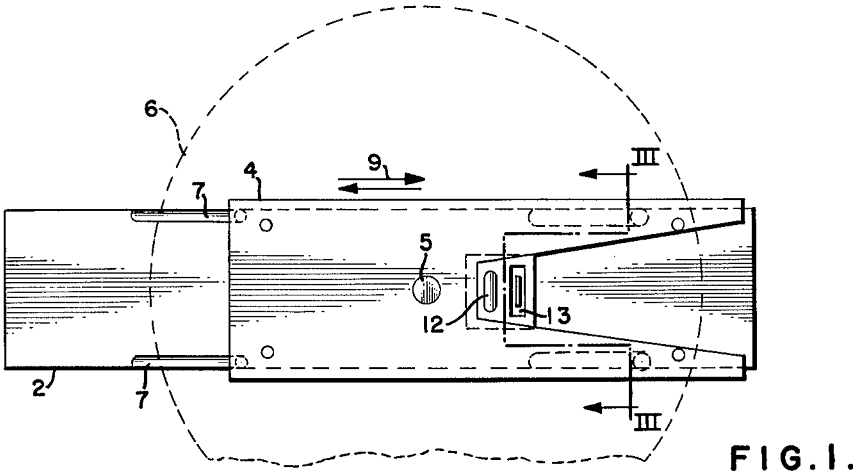
Figure 2:
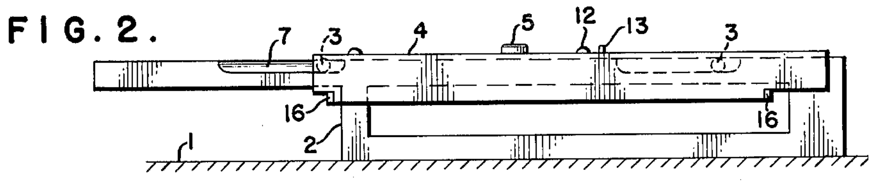

The invention will be described in more detail with reference to the attached drawing, FIG. 1 of which is a plan of the arrangement, FIG. 2 a side view, and FIG. 3 a section taken on the section line III—III of FIG. 1. The FIGS. 1 and 2 show the arrangement on a scale of 1:2 and FIG. 3 on a scale of 1:1.

A bottom plate 1 supports an inverted U-shaped case 2. The latter supports with the aid of balls 3 a carriage 4, which is provided with a pivot 5, on which the disc 6 serving as a record carrier turns. The disc 6 is indicated schematically in FIG. 1 with dash-lines..

The balls 3 are in contact with the interior corners of the carriage 4 so that the carriage 4 is supported by the balls 3 and guided laterally by them. The balls in turn run on ball races 7 on the case 2, which have been formed in the present instance by removal of the corners within the corresponding portions of the case 2. However, they could also be formed by folding the corners inwardly to form an open slot or in some other similar way. The balls are made in this manner to rest on the lateral walls of the case at the same time as they are guided laterally by the web 8 thereof. By this arrangement, the carriage 4 is reciprocable with an extreme degree of smoothness relative to the case 2 as indicated by the arrows 9 of FIG. 1 at the same time as the carriage 4 is guided without any play in the supporting structure. The carriage may be forced over the balls 3 with a slight pressure, utilizing the resilience of the carriage material to contribute to intimate contact between the balls 3 and the case 2 as well as the carriage 4.

As indicated on the drawing, the case may contain a motor 10, the axle 11 of which rotates the disc 6 by means of an intermediate wheel 12 serving as a coupling member. The displacement of the carriage 4 with the disc 6 in the direction of the arrows 9 may be obtained in well-known manner, i.e., with the aid of a spiral-shaped groove on the disc or by means of a worm-gear and nut arrangement, as shown for instance in British Patent No. 756,800, published September 12, 1956, and owned by the assignee of the instant application. During the displacement of the disc, a known recording head 13 indicated somewhat schematically on the drawing cooperates with the magnetic layer deposited on the disc for recording and reproducing sound.

Figure 3:
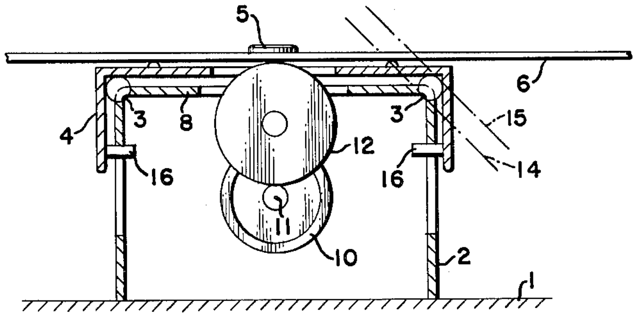

As is apparent from the drawing the points of contact between the ball 3 shown in FIG. 3 and the ball race 7 are on the dash-dot line 14 and those between the ball 3 and the carriage 4 on the line 15. The construction can be such as to make the lines 14 and 15 parallel, whereby a purely rolling movement of the balls and correspondingly smooth displacement of the carriage 4 are obtained. However, the angle formed between the lines 14 and 15 and the web 8 of the case may vary within wide limits from the value of about 45° shown on the drawing, it being possible under certain conditions to obtain locking of the carriage 4 without the locking flanges 16.

What I claim is:

1. In a sound transducer, a reciprocable carriage for carrying a rotatable disc, said carriage being of inverted channel-shaped cross-section; a case of complementary cross-sectional shape disposed within said reciprocable carriage; ball bearing races formed in the corners of said case where the side walls thereof intersect the top surface thereof; and balls in said races contacting the internal surfaces of the side and top walls of the reciprocable carriage, whereby said carriage is reciprocable relative to said case.

2. Apparatus as set forth in claim 1 wherein the dimensions of said carriage relative to the lateral spacing between said balls are such that said carriage is subjected to a resilient lateral deformation by said balls, so as to suppress relative lateral movement between said carriage and said case.

3. Apparatus as set forth in claim 1 wherein a line adjoining the two points of contact of each of said balls with the side and top walls, respectively, of said case is parallel to a corresponding line adjoining the two points of contact of a corresponding ball with the inner surfaces of the top and side walls of said carriage.

4. In a sound-recording apparatus, a reciprocable carriage for carrying a rotatable disc, said carriage being of inverted channel-shaped cross-section; a case of complementary cross-sectional shape disposed within said reciprocable carriage; means forming ball bearing races along the upper longitudinal corners of said case the lower portions of said races being formed by the side walls of said case and the lateral portions of said races being formed by the top wall of said case; ball bearing members disposed in said races for supporting said carriage by contacting the side wall of said case and the inner surface of the top wall of said carriage, and for restraining relative lateral movement between said case and said carriage by contacting the top wall of said case and the inner surface of the side walls of said carriage.

5. Apparatus as set forth in claim 4 wherein said races comprise cut-away portions of the upper corners of said case along the intersections of the side and top walls of said case.

6. Apparatus as set forth in claim 4 wherein said races comprise inwardly folded portions of the side and top walls of said case immediately adjacent the normal line of intersection thereof.

7. Apparatus as set forth in claim 4 further comprising a disc rotatably mounted on said carriage; and means disposed in said case and extending through said carriage for rotating said disc.

References Cited by the Examiner

UNITED STATES PATENTS

| | | | |
|---|---|---|---|
| 519,614 | 5/1894 | McKelvey | 274—12 |
| 1,611,065 | 12/1926 | Prescott | 274—12 |
| 1,862,800 | 6/1932 | Otten | 274—12 |

FOREIGN PATENTS

| | | |
|---|---|---|
| 198,685 | 1/1924 | Great Britain. |

LOUIS J. CAPOZI, *Primary Examiner.*

ALDRICH F. MEDBERY, *Examiner.*